US009168971B2

(12) United States Patent
Sato

(10) Patent No.: US 9,168,971 B2
(45) Date of Patent: Oct. 27, 2015

(54) ACCELERATOR OPERATING DEVICE

(75) Inventor: Masatoshi Sato, Saitama (JP)

(73) Assignee: HONDA MOTOR CO., LTD., Tokyo (JP)

( * ) Notice: Subject to any disclaimer, the term of this patent is extended or adjusted under 35 U.S.C. 154(b) by 220 days.

(21) Appl. No.: 12/961,194

(22) Filed: Dec. 6, 2010

(65) Prior Publication Data

US 2011/0132128 A1    Jun. 9, 2011

(30) Foreign Application Priority Data

Dec. 8, 2009   (JP) .................................. 2009-278502

(51) Int. Cl.
*B62K 23/04*    (2006.01)

(52) U.S. Cl.
CPC ............. *B62K 23/04* (2013.01); *Y10T 74/2028* (2015.01); *Y10T 74/2066* (2015.01); *Y10T 74/20287* (2015.01)

(58) Field of Classification Search
CPC ........ B62K 23/00; B62K 23/02; B62K 23/04; B62K 23/08
USPC ............. 74/488, 489, 491, 500.5, 502.2, 531; 180/219, 335; 200/61.39, 61.54, 61.85, 200/61.86, 61.88, 293.1, 332.2; 267/212, 267/238
See application file for complete search history.

(56) References Cited

U.S. PATENT DOCUMENTS

| | | | |
|---|---|---|---|
| RE34,302 E * | 7/1993 | Imoehl ........................... 123/399 |
| 6,240,801 B1 * | 6/2001 | Kojima et al. .................. 74/513 |
| 6,840,096 B2 * | 1/2005 | Samoto et al. ............. 73/114.36 |
| 6,978,694 B2 * | 12/2005 | Peppard ........................... 74/489 |
| 8,272,294 B2 * | 9/2012 | Ashman ........................... 74/531 |
| 8,302,467 B2 * | 11/2012 | Tanaka et al. .............. 73/114.36 |
| 2008/0154537 A1 * | 6/2008 | Gamberini et al. ........... 702/151 |
| 2009/0293668 A1 * | 12/2009 | Kondo et al. ................. 74/551.9 |
| 2010/0126299 A1 * | 5/2010 | Baldassari et al. .............. 74/491 |
| 2011/0036196 A1 | 2/2011 | Menghini |

FOREIGN PATENT DOCUMENTS

| | | |
|---|---|---|
| JP | 11-342763 A | 12/1999 |
| JP | 2001-214762 A | 8/2001 |
| JP | 2002-264876 A | 9/2002 |
| JP | 2006-182178 A | 7/2006 |
| TW | 200944421 A | 11/2009 |

* cited by examiner

*Primary Examiner* — David M Fenstermacher
*Assistant Examiner* — Emily Cheng
(74) *Attorney, Agent, or Firm* — Birch, Stewart, Kolasch & Birch, LLP

(57) ABSTRACT

An accelerator operating device for electrically controlling the output of a power unit on the basis of the manipulated variable of a controller, by achieving the generation of a frictional resistance using a simple configuration. An accelerator operating device includes an extended portion turned upon the operation of a throttle grip; a torsion coil spring biasing the extended portion in a returning direction while the extended portion is turned; and a friction generating mechanism adding a frictional resistance to the turning movement. The friction generating mechanism includes a compression coil spring applying a pressing force to the extended portion, and a friction member brought into sliding contact with the extended portion by being pressed by the compression coil spring. The torsion coil spring and the compression coil spring are placed coaxially with the extended portion and overlap each other at least partially along the axial direction of the extended portion.

17 Claims, 3 Drawing Sheets

ACCELERATOR OPERATING DEVICE

CROSS-REFERENCE TO RELATED APPLICATIONS

The present application claims priority under 35 USC 119 to Japanese Patent Application No. 2009-278502 filed on Dec. 8, 2009 the entire contents of which are hereby incorporated by reference.

BACKGROUND OF THE INVENTION

1. Field of the Invention

The present invention relates to an accelerator operating device for electrically controlling the output of a power unit on the basis of the manipulated variable of a controller.

2. Description of Background Art

In the accelerator operating device, cables to mechanically open and close throttle valves of engines (internal combustion engines, power units) have been eliminated. Thus, in order to give drivers an operation feeling similar to that obtainable from the configuration including the cables, there is provided an accelerator operating device configured as below. For example, a moving member movable in the axial direction of a throttle grip (controller) correspondingly to turning movement of the throttle grip is provided in a throttle holder (case). As the throttle grip is turned, the moving member correspondingly moves in the axial direction and compresses an elastic member inside the throttle holder so that a frictional resistance produced by the pressing force may be changed correspondingly. See for example, FIG. 1 of Japanese Patent Application Publication No. 2006-182178.

However, in the above conventional technique, a mechanism to move the moving member and also a certain space for the movement need to be provided inside the throttle holder. This leads to a complicated configuration and also makes it difficult to make the devices compact. Further, consideration is needed for where to place a sensor that detects the amount of turning movement of the throttle grip.

SUMMARY AND OBJECTS OF THE INVENTION

With this background, according to an embodiment of the invention it is an object to make compact an accelerator operating device, which electrically controls the output of a power unit on the basis of the manipulated variable of a controller, by achieving the generation of a frictional resistance using a simple configuration, and also to make the device easily applicable to various vehicle types.

As means for solving the above problems, according to an embodiment of the present invention an accelerator operating device, throttle operating device 1, is provided which electrically controls an output of a power unit on the basis of a manipulated variable of a controller, throttle grip 3, the accelerator operating device includes a turning member, extended portion 9, turned upon operation of the controller; a return spring, torsion coil spring 5, biasing the turning member in a returning direction while the turning member is turned; and a friction generating mechanism 6 adding a frictional resistance to turning movement of the turning member, wherein the friction generating mechanism includes a friction spring, compression coil spring 21, applying a pressing force to the turning member, and the friction spring and the return spring overlap with each other at least partially along an axial direction of the turning member.

According to an embodiment of the present invention, the friction generating mechanism includes a friction member 19 brought into sliding contact with the turning member by being pressed by the friction spring, and causes friction between the friction member and the turning member.

According to an embodiment of the present invention, a sensor 4 sensing an amount of turning movement of the turning member is provided.

According to an embodiment of the present invention, the turning member includes a sensor rotor 12 to be subjected to the sensing by the sensor.

According to an embodiment of the present invention, the return spring is located inward of the friction spring in a radial direction of the turning member.

According to an embodiment of the present invention, part, outer annular portion 14, of the turning member is located between the return spring and the friction spring in a radial direction of the turning member.

According to an embodiment of the present invention, one end of the return spring and one end of the friction spring are supported by a common guide member 15.

According to an embodiment of the present invention, the accelerator operating device is provided to a handlebar 2, the controller is a grip turnable relative to the handlebar, and a case, throttle holder 11, mounted to the handlebar houses the turning member, a sensor sensing an amount of turning movement of the turning member, a sensor rotor to be subjected to the sensing by the sensor, the return spring and the friction generating mechanism.

According to an embodiment of the present invention, the return spring and the friction spring are coil springs wound about the handlebar.

According to an embodiment of the present invention, a frictional resistance can be added to turning movement of the turning member with a simpler configuration than conventional configurations including a moving member moving in the axial direction of the turning member correspondingly to turning movement of the turning member. Moreover, since the springs overlap with each other at least partially along the axial direction of the turning member, the device can be made compact.

According to an embodiment of the present invention, the output of the power unit can be electrically controlled in accordance with the amount of turning movement of the turning member, even without a cable and the like for joining the turning member to the power unit.

According to an embodiment of the present invention, the turning member also serves as the sensor rotor. This eliminates the need for additionally providing a gear, a sensor rotor and the like for the sensing and thus makes it possible to suppress an increase in the number of components.

According to an embodiment of the present invention, the arrangement of the springs can be made compact. Moreover, by changing only the friction spring located on the radially outer side, the friction properties can be easily changed to be suitable for a certain vehicle type and/or the like.

According to an embodiment of the present invention, the springs can be prevented from being displaced in the radial direction of the turning member and also their arrangement can be made compact.

According to an embodiment of the present invention, only one guide member is needed to support the one end of each of the springs, thereby suppressing an increase in the number of components.

According to an embodiment of the present invention, the device can be made compact, and the mounting of the device can be made simple as well.

According to an embodiment of the present invention, the arrangement of the springs can be made compact.

Further scope of applicability of the present invention will become apparent from the detailed description given hereinafter. However, it should be understood that the detailed description and specific examples, while indicating preferred embodiments of the invention, are given by way of illustration only, since various changes and modifications within the spirit and scope of the invention will become apparent to those skilled in the art from this detailed description.

BRIEF DESCRIPTION OF THE DRAWINGS

The present invention will become more fully understood from the detailed description given hereinbelow and the accompanying drawings which are given by way of illustration only, and thus are not limitative of the present invention, and wherein.

DETAILED DESCRIPTION OF THE PREFERRED EMBODIMENTS

Figure 1:
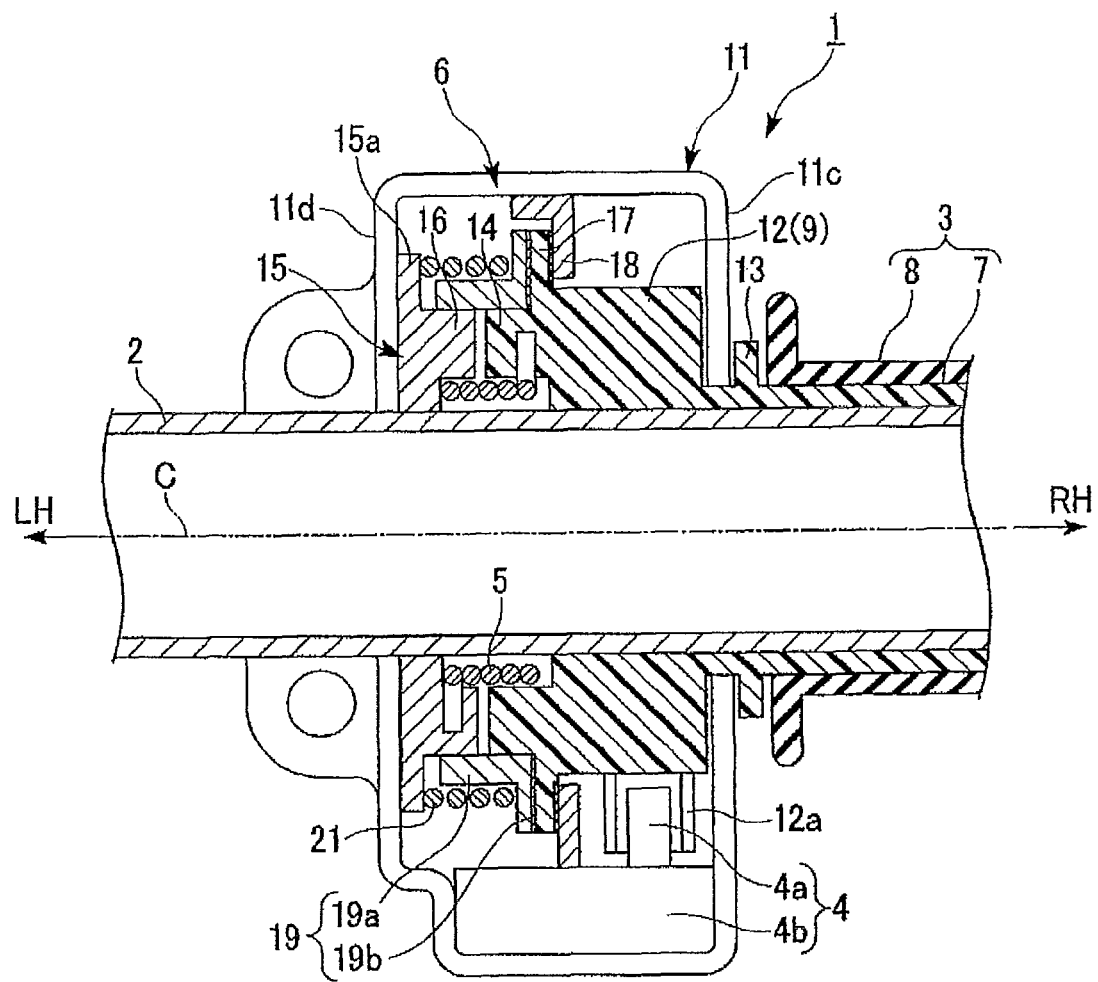
FIG. 1 is a cross-sectional view taken along a plane extending in the axial direction of a throttle grip of a throttle operating device of an embodiment of the present invention.

Hereinbelow, embodiments of the present invention will be described by referring to the drawings.

Figure 2:
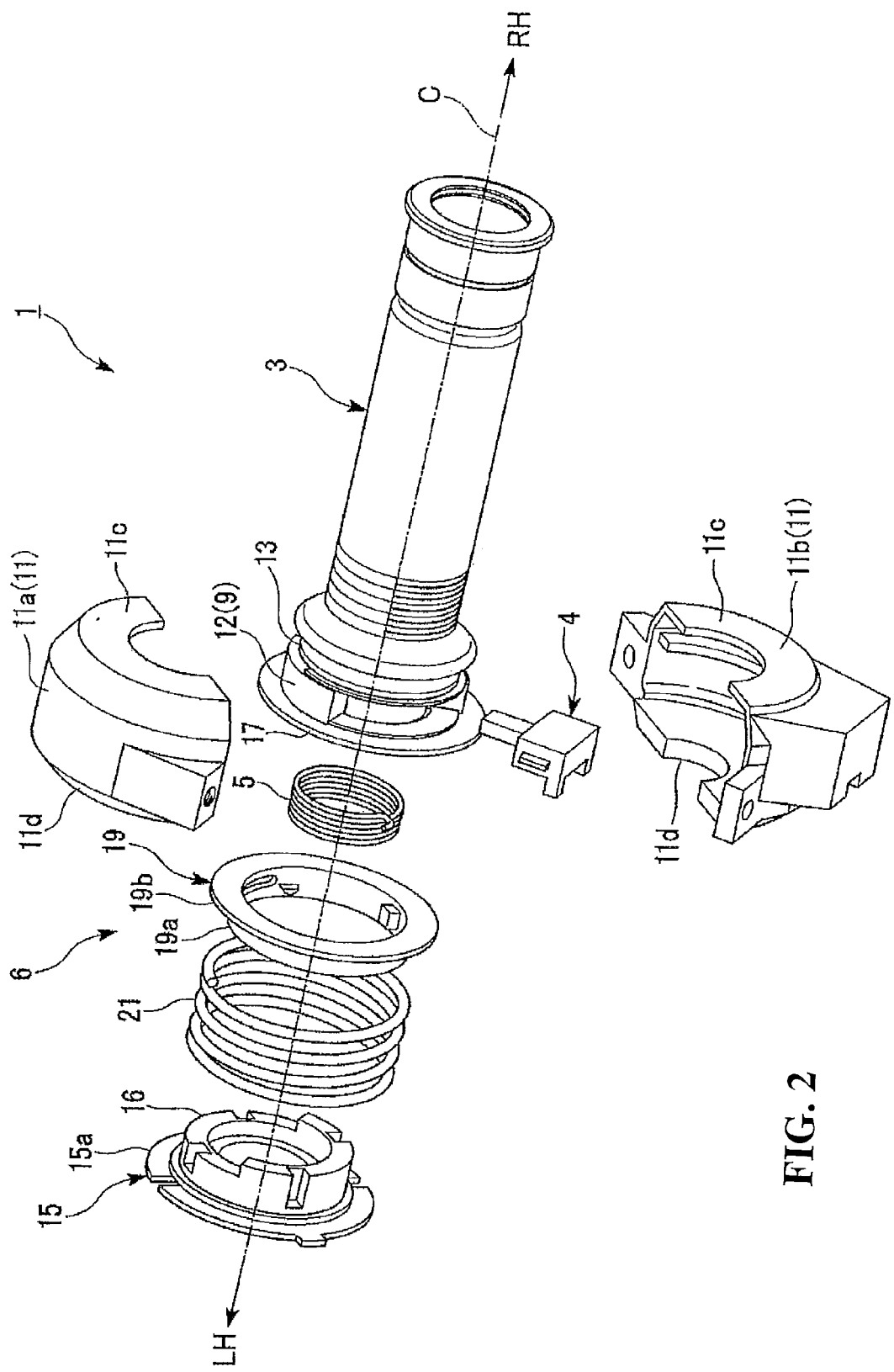
FIG. 2 is an exploded perspective view of the throttle operating device.

FIGS. 1 and 2 show a mode where a throttle operating device 1 as an embodiment of the present invention is provided to a right handlebar (simply referred to as handlebar below) 2 of a steering bar handle of a motorcycle (straddle type vehicle), for example. Note that this motorcycle includes, as its prime mover, an engine (internal combustion engine) provided with an electronically controlled fuel injector.

The throttle operating device 1 includes a throttle grip 3 turnably supported on the straight cylindrical handlebar 2 by inserting the handlebar 2 therethrough; a sensor 4 detecting the amount of turning movement of the throttle grip 3; a torsion coil spring 5 applying, to the throttle grip 3, a return torque corresponding to the amount of turning movement of the throttle grip 3; and a friction generating mechanism 6 generating a frictional resistance (friction) when the throttle grip is turned. Note that in the drawings, a line C denotes the centerline axes of the handlebar 2 and the throttle grip 3, an arrow LH denotes the base end side of the handlebar 2 in its axial direction (i.e., an inner side in the width direction of the vehicle body, or a left side), and an arrow RH denotes the leading end side of the handlebar 2 in its axial direction (i.e., an outer side in the width direction of the vehicle body, or a right side). In the following, the direction of the arrow LH and the direction of the arrow RH will be often called a handle base end side and a handle leading end side, respectively.

The throttle grip 3 includes a resin-made sleeve 7 constituting an inner layer thereof, and a rubber-made grip main body 8 integrally attached to an outer circumference of the sleeve 7.

An extended portion 9 is formed coaxially and integrally with the sleeve 7 at the handle base end side thereof. The extended portion 9 extends from the end of the grip main body 8 at the handle base end side, toward the handle base end side. In addition, the extended portion 9 is turnably held by a throttle holder 11 fixed to the handlebar 2.

The throttle holder 11 is mounted to the handlebar 2 at a position beyond the above-mentioned end of the grip main body 8 toward the handle base side. The throttle holder 11 is formed of top and bottom halves 11a and 11b split at a plane parallel to the axial direction and a radial direction of the handlebar 2. These halves 11a and 11b are united together by bolting or the like with the handlebar 2 sandwiched therebetween, whereby a hollow case-shaped throttle holder 11 is mounted to an outer circumference of the handlebar 2.

The throttle holder 11 houses the extended portion 9, the sensor 4, the torsion coil spring 5 and the friction generating mechanism 6.

The sensor 4 is a non-contact magnetic sensor, which is formed of a sensing part 4a (sensor body) fixed to an inside of the throttle holder 11, and an IC part 4b communicating with the sensing part 4a. A sensor rotor 12 is integrally formed with an outer circumference of the extended portion 9 facing an inside of the throttle holder 11. The sensor rotor 12 includes a yoke portion 12a allowing the sensing part 4a to face the extended portion 9 inwardly in the radial direction. The sensing part 4a detects a magnetic force corresponding to the position of the sensor rotor 12 (the yoke portion 12a) turned. The IC part 4b in turn outputs an electric signal corresponding to the magnetic force to an ECU (unillustrated).

An outer flange 13 is integrally formed with an outer circumference of the sleeve 7 at the handle base end side (an outer circumference of the extended portion 9 at the handle leading end side). This outer flange 13 is adjacently located at the handle leading end side of a lateral wall 11c (outer lateral wall) of the throttle holder 11 at the handle leading end side. Meanwhile, the sensor rotor 12 having a larger diameter than the sleeve 7 is integrally formed with an outer circumference of a portion of the extended portion 9 facing the inside of the throttle holder 11.

The sensor rotor 12 is adjacently located at the handle base end side of the outer lateral wall 11c of the throttle holder 11. With the outer lateral wall 11c being sandwiched between the sensor rotor 12 and the outer flange 13 in the axial direction, the position of the throttle grip 3 relative to the throttle holder 11 (the handlebar 2) in the axial direction is determined.

An outer annular portion 14 is formed to protrude from an end portion of the extended portion 9 at the handle base end side. The outer annular portion 14 forms a predetermined clearance between itself and the handlebar 2 in the radial direction.

Meanwhile, an annular guide member 15 is held to a lateral wall 11d (inner lateral wall) of the throttle holder 11 at the handle base end side, in a fixed manner from the handle leading end side (from the inside of the throttle holder 11). An inner annular portion 16 is formed to protrude from an end portion of the guide member 15 at the handle leading end side and to face the outer annular portion 14 in the axial direction. The inner annular portion 16 forms a predetermined clearance between itself and the handlebar 2 in the radial direction. The torsion coil spring 5 is disposed inward of inner circumferences of these annular portions 14 and 16 with the handlebar 2 inserted therethrough.

One coil end of the torsion coil spring 5 is locked on the outer annular portion 14 whereas the other coil end is locked on the inner annular portion 16. Accordingly, upon the turning of the throttle grip 3 relative to the throttle holder 11, the torsion coil spring 5 comes to be elastically deformed and thus applies a biasing force to the throttle grip 3 in the returning direction of the turning movement.

In the throttle operating device 1 as above, the biasing force of the torsion coil spring 5 in the returning direction is applied to the throttle grip 3. However, this biasing force itself gives a different operation feeling from a conventional one obtained when the throttle-valve operation is performed via a throttle cable. So, in order to replicate this conventional operation feeling in a pseudo manner, the friction generating mechanism 6 is caused to generate mechanical friction when the throttle grip 3 is turned.

The friction generating mechanism 6 includes a friction flange 17 integrally formed with an outer circumference side of the extended portion 9; a positioning flange 18 standing on the inside of the case in such a way as to face the friction flange 17 in the axial direction and to be in contact with the friction flange 17 from the handle leading end side; an annular friction member 19 extending between the annular portions 14 and 16 of the sensor rotor 12 and the guide member 15 and fitted to their outer circumferences movably in the handle axial direction; and a compression coil spring 21 biasing the friction member 19 toward the handle leading end side.

The friction member 19 includes a cylindrical collar portion 19a fitted to the circumferences of the annular portions 14 and 16, and a flange portion 19b integrally formed with an outer circumference of an end portion of the collar portion 19a at the handle leading end side. The flange portion 19b is in contact with the friction flange 17 from the handle base end side. In addition, the flange portion 19b is pressed toward the handle leading end side by the spring force of the compression coil spring 21. Accordingly, the friction flange 17 is sandwiched between the flange portion 19b and the position flange 18 in the axial direction.

A guide flange 15a extending along an inner lateral surface of the throttle holder 11 is integrally formed with an outer circumference of the guide member 15. The compression coil spring 21 is provided between the guide flange 15a and the flange 19b in a compressed state. The inner circumference of the inner annular portion 16 of the guide member 15 supports the end portion of the torsion coil spring 5, which means that the guide member 15 supports the end portion of each of the coil springs.

The positioning flange 18, the guide flange 15a (the guide member 15) and the flange portion 19b (the friction member 19) cannot make axial turning movement relative to the throttle holder 11. Accordingly, as the throttle grip 3 is turned relative to the throttle holder 11 with the friction flange 17 sandwiched between the flange portion 19b and the positioning flange 18, a frictional resistance is generated due to sliding contact of the friction flange 17 with the flange portion 19b and the positioning flange 18. Consequently, the aforementioned operation feeling can be replaced in a pseudo manner.

Each of the coil springs 5 and 21 is wound while allowing the handlebar 2 to be inserted therethrough (each coil spring is wound about the handlebar 2) with a clearance given between the circumference thereof and the spring. These coil springs 5 and 21 are placed coaxially, sharing the axial line C.

Thereafter, the torsion coil spring 5 (return spring) and the compression coil spring 21 (friction spring) are placed to overlap with each other axially in large portions. Moreover, the torsion coil spring 5 located inward of the inner circumferences of the annular portions 14 and 16 is placed radially inward of the compression coil spring 21 located outwardly of the outer circumferences of the annular portions 14 and 16. Also, part (the outer annular portion 14) of the extended portion 9 of the throttle grip 3 is located between the coil springs 5 and 21 in the radial direction.

Such arrangement allows the coil springs 5 and 21 to be housed inside the throttle holder 11 in a compact fashion. The arrangement also allows the sensor 4 and the sensor rotor 12 to be placed beyond the coil springs 5 and 21 toward the handle leading end side (i.e., placed at different positions from the coil springs 5 and 21 in the handle axial direction). The sensor 4 and the sensor rotor 12 are therefore kept away from the coil springs 5 and 21 and housed efficiently in the throttle holder 11.

As described hereinabove, the throttle operating device 1 of the above embodiment electrically controls the output of the power unit on the basis of the manipulated variable of the throttle grip 3. The device 1 includes the extended portion 9 (turning member) turned upon the operation of the throttle grip 3; the torsion coil spring 5 (return spring) biasing the extended portion 9 in a returning direction while the extended portion 9 is turned; and the friction generating mechanism 6 adding a frictional resistance to turning movement of the extended portion 9. The friction generating mechanism 6 includes the compression coil spring 21 (friction spring) applying a pressing force to the extended portion 9, and the friction member 19 brought into sliding contact with the extended portion 9 by being pressed by the compression coil spring 21, and causes friction is between the friction member 19 and the extended portion 9. The torsion coil spring 5 and the compression coil spring 21 are placed coaxially with the extended portion 9 and overlap with each other at least partially along an axial direction of the extended portion 9.

According to this configuration, a frictional resistance can be added to turning movement of the extended portion 9 with a simpler configuration than conventional configurations including a moving member moving in the axial direction of the extended portion 9 correspondingly to turning movement of the extended portion 9. Moreover, since the coil springs 5 and 21 overlap with each other along the axial direction of the extended portion 9, the device 1 can be made compact.

In the throttle operating device 1, the sensor 4 sensing the amount of turning movement of the extended portion 9 is provided. Accordingly, the output of the power unit can be electrically controlled in accordance with the amount of turning movement of the extended portion 9, even without a cable and the like for joining the extended portion 9 to the power unit.

In the throttle operating device 1, the extended portion 9 includes the sensor rotor 12 to be subjected to the sensing by the sensor 4. Accordingly, the extended portion 9 also serves as the sensor rotor 12. This eliminates the need for additionally providing a gear, a sensor rotor and the like for the sensing and thus makes it possible to suppress an increase in the number of components.

In the throttle operating device 1, the torsion coil spring 5 is located inward of the compression coil spring 21 in the radial direction of the extended portion 9. Accordingly, the arrangement of the coil springs 5 and 21 can be made compact. Moreover, by changing only the compression coil spring 21 located on the radially outer side, the friction properties can be easily changed to be suitable for a certain vehicle type and/or the like.

In the throttle operating device 1, part (the outer annular portion 14) of the extended portion 9 is located between the torsion coil spring 5 and the compression coil spring 21 in the radial direction of the extended portion 9. Accordingly, the coil springs 5 and 21 can be prevented from being displaced in the radial direction of the extended portion 9 and also their arrangement can be made compact.

In the throttle operating device 1, one end of the torsion coil spring 5 and one end of the compression coil spring 21 are supported commonly by the guide member 15. Accordingly, only one guide member 15 is needed to support the one end of each of the torsion coil spring 5 and the compression coil spring 21, thereby suppressing an increase in the number of components.

In the throttle operating device 1, the throttle operating device 1 is provided to the handlebar 2 of a motorcycle. The throttle grip 3 is a grip turnable relative to the handlebar 2. The throttle holder 11 mounted to the handlebar 2 houses the extended portion 9, the sensor 4 sensing the amount of turning movement of the extended portion 9, the sensor rotor 12 to be subjected to the sensing by the sensor 4, the torsion coil spring 5 and the friction generating mechanism 6. Accordingly, the device 1 can be made compact, and the mounting of the device 1 can be made simple as well.

In the throttle operating device 1, the torsion coil spring 5 and the compression coil spring 21 are coil springs wound about the handlebar 2. Accordingly, the arrangement of the coil springs can be made compact.

In the throttle operating device 1, the sensor rotor 12 is placed outward of the friction generating mechanism 6 in the vehicle width direction. Accordingly, sensing components including the sensor rotor 12 can be easily housed in the throttle holder 11, thereby making the device 1 compact further.

Figure 3:
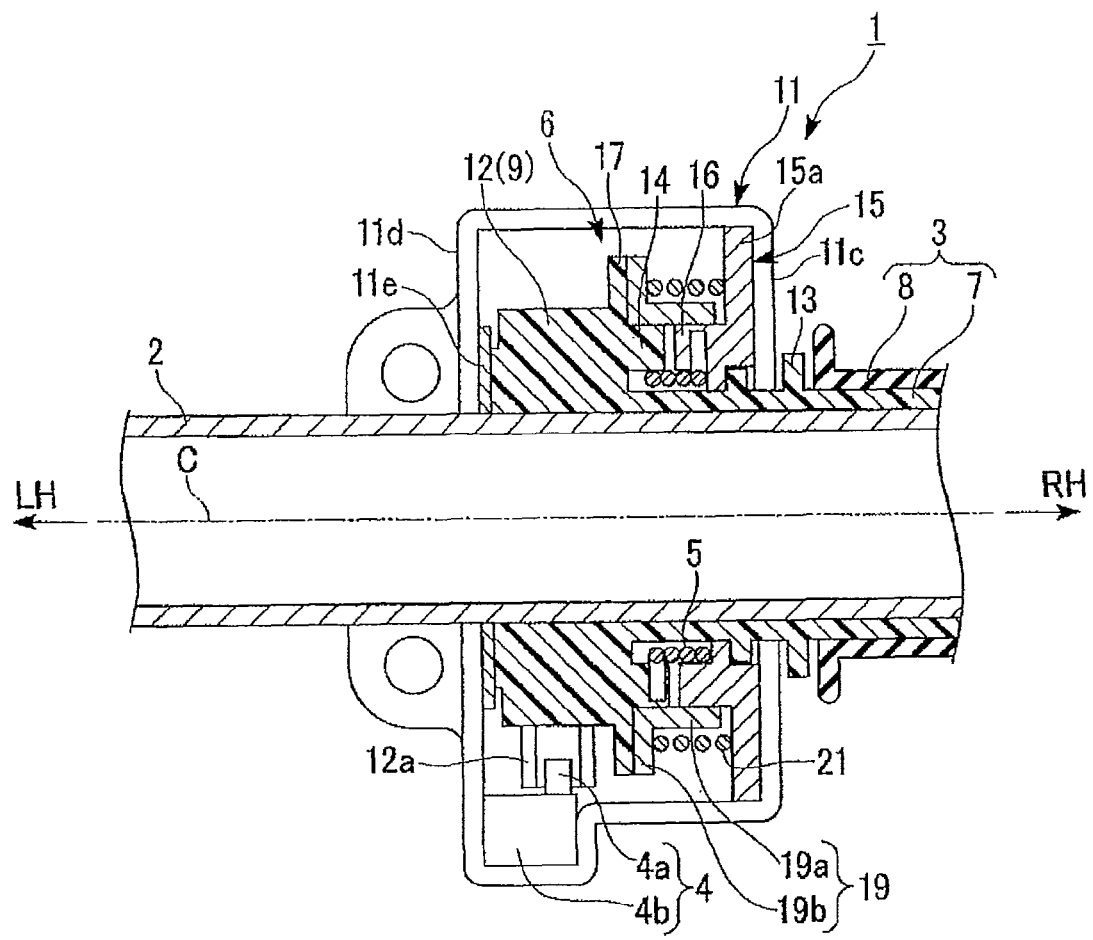
FIG. 3 is a cross-sectional view equivalent to FIG. 1 and showing a modification of the throttle operating device.

Here, the configuration may be such that the sensor 4 and the sensor rotor 12 are placed beyond the coil springs 5 and 21 toward the handle base end side, as shown in FIG. 3. Note that in FIG. 3, along with the change in the arrangement of the sensor 4 and the like, the arrangement of the friction generating mechanism 6 and the like is changed. In addition, the sensor rotor 12 is brought into contact with the inner lateral wall 11*d* of the throttle holder 11 with a thrust washer 11*e* interposed therebetween (the positioning flange 18 is omitted). The other components corresponding to those in the configuration in the above embodiment are denoted by the same reference numerals, and the description thereof will be omitted.

Note it is needless to say that the present invention is not limited to the above embodiment and that various modifications can be made without departing from the gist of the invention. For example, the present invention may have a configuration in which a controller for controlling the output of a power unit is provided to a part other than a handlebar, and/or in which a link mechanism is interposed between the controller and a turning member.

In the above embodiment, the torsion coil spring 5 (return spring) is placed at a radially inner side whereas the compression coil spring 21 (friction spring) is placed at a radially outer side. However, this arrangement may be such that their inside/outside relationship is reversed. In this case, the torsion coil spring, whose inner diameter becomes smaller upon twisting, is placed at the radially outer side. Thus, the compression coil spring, whose inner diameter remains the same regardless of twisting, is located at the radially inner side and therefore near the handlebar. The clearance between the compression coil spring and the handlebar in the radial direction according becomes smaller. This increases the degree of freedom in layout.

In addition, the application of the present invention is not limited to motorcycles using an internal combustion engine as a drive source. The present invention is applicable to hybrid vehicles using at least one of an internal combustion engine and a motor as a drive source and electric vehicles; three/four wheeled vehicles and motorized bicycles; and transportation means other than wheeled vehicles, such as boats, airplanes and snowmobiles.

The invention being thus described, it will be obvious that the same may be varied in many ways. Such variations are not to be regarded as a departure from the spirit and scope of the invention, and all such modifications as would be obvious to one skilled in the art are intended to be included within the scope of the following claims.

What is claimed is:

1. An accelerator operating device which electrically controls an output of a power unit on the basis of a manipulated variable of a controller, wherein the accelerator operating device is arranged in a case and comprises:
    a turning member turned upon operation of the controller;
    a return spring biasing the turning member in a returning direction while the turning member is turned; and
    a friction generating mechanism adding a frictional resistance to a turning movement of the turning member;
    wherein the friction generating mechanism includes:
        a friction member with a flange portion that extends outwardly in a radial direction of the turning member, with the flange portion facing one side of the turning member,
        a friction spring which applies a pressing force to the one side of the friction flange for pressing the friction flange against the one side of the turning member,
        a positioning flange standing on an inner circumference of the case and extending inwardly in the radial direction of the turning member,
        the positioning flange extending in such a way as to face and be in contact with an opposite side of the turning member, and
        wherein the friction spring is a coil spring and a portion of the return spring is arranged directly inside the friction spring in a manner such that the friction spring and the portion of the return spring arranged inside the friction spring directly overlap each other in the radial direction at least partially along an axial direction of the turning member.

2. The accelerator operating device according to claim 1, wherein the friction member also includes:
    a cylindrical collar portion arranged in the radial direction directly between an outer radial surface of an end of the turning member and an inner radial side of the friction spring, and
    wherein the flange portion is integrally formed with an outer circumference of an end portion of the cylindrical collar portion, and
    the friction member is brought into sliding contact with the turning member by being pressed by the friction spring, thereby causing a friction between the flange portion of the friction member and the friction flange of the turning member.

3. The accelerator operating device according to claim 1, wherein a sensor sensing an amount of turning movement of the turning member is provided.

4. The accelerator operating device according to claim 3, wherein part of the turning member is located between the return spring and the friction spring in the radial direction of the turning member.

5. The accelerator operating device according to claim 1, wherein the return spring is located inward of the friction spring in the radial direction of the turning member.

6. The accelerator operating device according to claim 1, further comprising:
    a common guide member provided separately from the case on one side of the accelerator operating device along the axial direction of the turning member,
    the common guide member having a flat face abutting directly against an inner lateral wall at one end of the case in the axial direction opposite to where the turning member is located, and directly supporting one end of each of the return spring and the friction spring facing the one side of the accelerator operating device.

7. The accelerator operating device according to claim 1, wherein part of the turning member is located between the return spring and the friction spring in the radial direction of the turning member.

8. The accelerator operating device according to claim 1, wherein one end of each of the return spring and the friction spring is directly supported by the common guide member.

9. The accelerator operating device according to claim 1, wherein the accelerator operating device is mounted on a handlebar;
the controller is a grip turnable relative to the handlebar;
the case is mounted to the handlebar houses the turning member;
a sensor sensing an amount of turning movement of the turning member; and
a sensor rotor to be subjected to the sensing by the sensor, the return spring and the friction generating mechanism.

10. The accelerator operating device according to claim 9, wherein the return spring is a coil spring and each of the friction spring and the return spring is wound about the handlebar.

11. The accelerator operating device according to claim 1, wherein the case is mounted on a handlebar, and further comprising:
a common guide member provided separately from the case on one side of the accelerator operating device along the axial direction of the turning member, and
the common guide member is a single member provided on the one side of the accelerator operating device along the axial direction of the turning member, and is arranged entirely inside the case and directly abuts a portion of the inner lateral wall of the case extending radially outwardly from the handlebar.

12. An accelerator operating device which electrically controls an output of a power unit on the basis of a manipulated variable of a controller, wherein the accelerator operating device is arranged in a case and comprises:
a turning member turned upon operation of the controller;
a return spring biasing the turning member in a returning direction while the turning member is turned; and
a friction generating mechanism adding a frictional resistance to a turning movement of the turning member;
wherein the friction generating mechanism includes a friction spring applying a pressing force to the turning member, and
the friction spring and the return spring overlap with each other at least partially along an axial direction of the turning member,
wherein the friction generating mechanism includes:
a friction member with a flange portion that extends outwardly in a radial direction of the turning member, with the flange portion facing one side of the turning member,
a friction spring which applies a pressing force to the one side of the friction flange for pressing the friction flange against the one side of the turning member,
a positioning flange standing on an inner circumference of the case and extending inwardly in the radial direction of the turning member,
the positioning flange extending in such a way as to face and be in contact with an opposite side of the turning member,
a cylindrical collar portion arranged directly between an end of the turning member and the friction spring in the radial direction of the turning member,
wherein the flange portion is integrally formed with an outer circumference of an end portion of the cylindrical collar portion.

13. The accelerator operating device according to claim 12, wherein the case is mounted on a handlebar, and further comprising
a common guide member provided separately from the case on one side of the accelerator operating device along the axial direction of the turning member,
wherein the common guide member is a single member provided on the one side of the accelerator operating device along the axial direction of the turning member, and is arranged entirely inside the case and directly abuts a portion of the inner lateral wall of the case extending radially outwardly from the handlebar.

14. The accelerator operating device according to claim 12, wherein the case has an upper semi-circular half and a lower semi-circular half, and
the common guide member has a flat face abutting directly against an inner lateral wall at one end of the upper and lower semi-circular halves of the case in the axial direction, and directly supporting one end of each of the return spring and the friction spring facing the one side of the accelerator operating device.

15. An accelerator operating device which electrically controls an output of a power unit on the basis of a manipulated variable of a controller, wherein the accelerator operating device is arranged in a case and comprises:
a turning member turned upon operation of the controller;
a return spring biasing the turning member in a returning direction while the turning member is turned; and
a friction generating mechanism adding a frictional resistance to a turning movement of the turning member;
wherein the friction generating mechanism includes:
a friction member with a flange portion that extends outwardly in a radial direction of the turning member, with the flange portion facing one side of the turning member,
a friction spring which applies a pressing force to the one side of the friction flange for pressing the friction flange against the one side of the turning member,
a positioning flange standing on an inner circumference of the case and extending inwardly in the radial direction of the turning member,
the positioning flange extending in such a way as to face and be in contact with an opposite side of the turning member,
the friction spring and the return spring overlap with each other at least partially along an axial direction of the turning member, and
the friction member is formed with an inner circumferential surface fitted around an outer annular portion of the turning member.

16. The accelerator operating device according to claim 15, wherein the case is mounted on a handlebar, and
the accelerator operating device further comprising:
a common guide member provided separately from the case on one side of the accelerator operating device along the axial direction of the turning member,
the common guide member having an outer diameter that is smaller than an outer diameter of the case, a flat face abutting directly against an inner lateral wall at one end of the case in the axial direction, and directly supporting one end of each of the return spring and the friction spring facing the one side of the accelerator operating device, the common guide member is a single member provided on the one side of the accelerator operating device along the axial direction of the turning member, and is arranged entirely inside the case and directly abuts a portion of the inner lateral wall of the case extending radially outwardly from the handlebar.

17. The accelerator operating device according to claim 15, wherein the case has an upper semi-circular half and a lower semi-circular half, and the common guide member has a flat face abutting directly against an inner lateral wall at one end of the upper and lower semi-circular halves of the case in the axial direction, and directly supporting one end of each of the return spring and the friction spring facing the one side of the accelerator operating device.

\* \* \* \* \*